3,225,105
MANUFACTURE OF MERCAPTIDES
Paul F. Warner and Edward J. Horning, Phillips, Tex., assignors to Phillips Petroleum Company, a corporation of Delaware
No Drawing. Filed June 25, 1962, Ser. No. 205,116
9 Claims. (Cl. 260—609)

This invention relates to the preparation of substantially pure mercaptides. In one aspect it relates to a process for the production of alkali metal alkyl mercaptides from hydrogen sulfide.

Mercaptides are the metal salts of alkyl mercaptans which, in turn, can be synthetically prepared from the reaction of olefins with hydrogen sulfide. Mercaptides, like their precursor mercaptans, also find utility in the polymerization of monomers which produce synthetic rubbers. The preparation of substantially pure mercaptides, on a commercial scale at economic costs is much to be desired to provide a marketable product.

In the past, preparation of alkali metal alkyl mercaptides has been carried out by reacting alkyl mercaptans with aqueous solutions of alkali hydroxides, perhaps using an inert organic liquid as mercaptide reaction medium. The reaction mixture must then be refluxed to separate most of the water as an azeotrope with the inert reaction medium. Even with the time consuming water separation step, the mercaptides yields only range between 60 and 70 percent, based on the amount of mercaptan charged.

It is, therefore, an object of this invention to provide a process for preparing substantially pure mercaptides.

Another object is to effect the production of alkali metal alkyl mercaptides from mercaptans in improved yields.

Still another object is to react olefins with hydrogen sulfide to form a reaction mixture which serves as the exclusive medium for the subsequent reaction of mercaptans with alkali metal hydroxides to form mercaptides.

Other objects, aspects, and advantages of the invention will be apparent from a study of the disclosure and the appended claims.

Broadly, according to the present invention, an alkymercaptan, preferably as prepared synthetically from pure reactants, while dispersed in a non-aqueous reaction diluent, is subjected to a treatment comprising, intimately contacting the diluted mercaptan with substantially non-aqueous particulate alkali metal hydroxide, effecting the precipitation of insoluble metal alkyl mercaptide, and recovering as a product of the process substantially pure alkyl mercaptans so produced, having a water content within acceptable limits for marketing. It is surprising that this reaction occurs at a reasonable rate, as the one reactant the solid alkali metal hydroxide is reacting with a liquid, the alkyl mercaptan.

In carrying out our invention, we normally employ as starting materials, commercial grades of $H_2S$ and olefin monomers, which are contacted in stoichiometric amounts under reaction conditions, such as in an ultraviolet ray reactor. The effluent from the reaction zone will be a mixture of a major portion of an alkyl mercaptan and a minor portion of a dialkyl sulfide, the latter being suitable for use as an inert reaction medium for the preparation of the mercaptide. In one specific embodiment of this invention, employing propylene as the olefin reactant, the reactor effluent comprises approximately about 80 parts by weight of n-propyl mercaptan to every 20 parts by weight of di-n-propyl sulfide. As indicated above, the sulfide product need not be fractionated, since it is suitable for use as an inert reaction medium.

The mercaptan concentrate from such sources, or any other suitable source, may be further diluted by the addition of more dialkyl sulfide. Alternatively, or additionally, another inert organic diluent can be employed. Among the compounds preferred for this purpose, though not exclusively suitable, are methanol, monomethyl ether of ethylene glycol (methyl "Cellosolve"), monomethyl ether of diethylene glycol (methyl "Carbitol"), and the like. The resulting mercaptan slurry is contacted, in stoichiometric amount, with substantially non-aqueous alkali metal hydroxide to effect precipitation of the mercaptan as alkali metal alkyl mercaptide. The precipitation is suitably carried out at temperatures ranging from ambient up to 120° F. The solid mercaptides are substantially insoluble in the organic diluents, and may be separated therefrom by filtration, centrifuging, or other suitable physical means.

As these solid mercaptides have been found invariably to contain some neutral oil, which is absorbed or otherwise mixed with the product, it may be desired to subject the separated solid mercaptides to a washing treatment with a solvent in which the mercaptide is substantially insoluble and which has a boiling point different from, and preferably lower than, the boiling point of the residual oil impurity with which the mercaptide may be contaminated. As a solvent we prefer to use a low-boiling hydrocarbon solvent, especially low-boiling paraffins, such as propane, butane, pentane, and the like. The washing is best effected at relatively low temperatures, such as ambient or sub-ambient temperatures, to minimize solution of mercaptide in wash solvent.

After washing with an amount of solvent adequate to remove the residual oil substantially completely, the remaining solvent is removed from the solid mercaptides by suitable means preferably by contacting the washed precipitate with a warm inert gas, such as methane, nitrogen or the like, or by heating and/or reduction of pressure to evaporate the residual solvent. Any of these methods may be used advantageously at temperatures on up to say about 200° F. In this manner, an alkali metal mercaptide is obtained of a purity not heretofore obtainable. The thus purified mercaptide may be usable, per se, for example, as a modifier in polymerizations leading to the production of synthetic rubbers.

Inasmuch as the production of especially pure product is an important object of this invention, we prefer to carry out the steps of precipitation, filtration, and washing of the mercaptide precipitate in the absence of air in order to prevent any oxidation of the mercaptide, with subsequent contamination of the mercaptide with undesired materials, and this also is an aspect of our invention in preferred form.

In the preparation of the pure mercaptides as just described, we prefer to use as precipitating agent a finely divided solid alkali metal hydroxide, preferably one having a concentration of alkali metal oxide of at least 60 percent. In the instance of sodium hydroxide, which is preferred hydroxide for use in this invention, the commercially available grades of 60% and 76% $Na_2O$ content are quite acceptable. Hydroxides of any of the alkali metals; namely, of lithium, sodium, potassium, rubidium or cesium, may be used, but sodium and potassium hydroxides are ordinarily the most readily available.

Among the olefins suitable for reaction with hydrogen sulfide to form the intermediate mercaptan compound are the following: ethylene, propylene, butene, pentene, and hexene.

Among the organic liquids suitable as a supplementary diluent for the mercaptan are the alcohols and glycols. Preferred among these are: methanol, methyl "Cellosolve," methyl "Carbitol," and the like. Use of these diluents reduces the time for completion of the reaction.

The structure of the mercaptan precursor is important in determining the solubility of its mercaptide. Many alkenyl mercaptans, some aromatic mercaptans (thiophenols), and many alkyl mercaptans containing one or more substituent groups, such as halogen, hydroxy, etc., inert under the conditions of use, also form solid mercaptides. The present invention is applicable to processing mercaptans capable of forming solid metal mercaptides.

As an example of our invention, the following data are given but it will be understood that it is exemplary only, and not to be construed as unduly limitative of the invention.

*Example I*

A mixture of 80 parts n-propyl mercaptan to 20 parts di-n-propyl sulfide is prepared according to methods taught in the prior art. Exemplary of these are the preparation of alkyl mercaptans as taught in U.S. Patent 2,592,089, issued April 8, 1952. Therein is taught a process which essentially consists of reacting a purified olefinic hydrocarbon material with hydrogen sulfide in the presence of a mercaptan-synthesis catalyst and in amounts to give a mol ratio of $H_2S$ to olefin between 1.5:1 and 2:1, at a pressure of about 500 to 1500 pounds per square inch, a temperature of about 100 to 250° F., and a flow rate such as to effect a high per pass conversion of the olefin.

Nineteen pounds of the above described reaction mixture was added to a stirred slurry comprising, as follows:

Parts by weight, lbs.
Di-n-propyl sulfide _____ 90
Methanol _____ 10
Sodium hydroxide (flake) _____ 8

The resulting mixture was stirred at ambient temperature and atmospheric pressure for about 30 minutes. The final mixture was a slurry which analyzed as follows:

Parts by weight, lbs.
Sodium mercaptide _____ 19.6
Di-n-propyl sulfide _____ 93.8
Methanol _____ 10.0
Water of reaction _____ 3.6

The mercaptide was filtered off, and dried under vacuum with heat in the range of 100 to 120° F. The filtrate (sulfide, methanol, and water) is recycled to form the slurry to which the mercaptan-sulfide mixture is added. Four additional batches were made in this manner for a total of 98 pounds of mercaptide.

*Example II*

An additional 98 pounds of mercaptide product was prepared as described above, with the exception that a 50% aqueous solution of NaOH was employed, as taught in the prior art, to convert the mercaptan as solid sodium mercaptide.

The following comparative tabulation indicates the charge make-up, and the composition of the reaction product:

|  | Present Method | Prior Art Method |
|---|---|---|
| Charge, lb.: |  |  |
| n-$C_3H_7SH$ | 76 | 76 |
| NaOH | 40 | 40 |
| Water of solution |  | 40 |
| Reactor Product: |  |  |
| $C_3H_7SNa$, lb | 98 | 98 |
| Water of solution, lb |  | 40 |
| Water of reaction, lb | 18 | 18 |
| Water content, wt. percent | 15.5 | 37.2 |

It is evident that the water content of the product of the prior art method is substantially higher than that of the present method. The prior art product only was subjected to azetropic distillation to reduce the water content to levels comparable to that of the present product.

The effect on mercaptide yield is seen in the following tabulation:

| Residuum From Azeotropic Distillation* | Present Method | Prior Art Method |
|---|---|---|
| $C_3H_7SNa$, lb |  | 65 |
| Water, lb |  | 11.2 |
| Water content of product, wt. percent |  | 14.8 |
| Wt. yield ratio recovered $C_3H_7SNa$/$C_3H_7SH$ charged | 1.29 | 0.855 |

*Not required in present method.

Mercaptide produced and recovered for the identical amounts of n-propyl mercaptan charged was 50% higher for the present invention over the prior art method.

Reasonable variations and modifications are possible within the scope of the disclosure and the appended claims to the invention.

We claim:

1. A process for the preparation of substantially pure mercaptides comprising: contacting an olefin with hydrogen sulfide to form a reaction product comprising a major amount of alkyl mercaptan and a minor amount of dialkyl sulfide; contacting the entire reaction product with substantially non-aqueous alkali metal hydroxide having an alkali metal oxide content of at least 60 percent effecting the precipitation of an alkali metal alkyl mercaptide; said minor amount of dialkyl sulfide serving as a reaction medium; and recovering substantially pure said mercaptide as product.

2. A process for preparation of substantially pure mercaptides comprising: contacting an olefin with hydrogen sulfide to form a reaction product comprising a major amount of alkyl mercaptan and a minor amount of dialkyl sulfide; diluting the reaction product by adding a non-aqueous organic diluent to said reaction product; contacting the resulting slurry with a substantially non-aqueous alkali metal hydroxide having an alkali metal oxide content of at least 60 percent effecting the precipitation of an alkali metal alkyl mercaptide; said minor amount of dialkyl sulfide serving as a reaction medium; and recovering a substantially pure said mercaptide as product.

3. The process according to claim 1 in which said olefin is selected from the group consisting of ethylene, propylene, butene, pentene, and hexene.

4. The process according to claim 2 in which said organic diluent is selected from the group consisting of methanol, monomethyl ether of ethylene glycol, and monomethyl ether of diethylene glycol.

5. The process according to claim 1 in which said alkali metal hydroxide is selected from the group consisting of lithium hydroxide, sodium hydroxide, potassium hydroxide, rubidium hydroxide, and cesium hydroxide.

6. A process for preparation of substantially pure sodium n-propyl mercaptide comprising: contacting propylene with hydrogen sulfide to form a reaction product comprising a major amount of n-propyl mercaptan and a minor amount of di-n-propyl sulfide, the latter compound serving as reaction medium for a subsequent reaction; contacting the reaction product with substantially non-aqueous sodium hydroxide having a sodium oxide content of at least 60 percent effecting the precipitation of sodium n-propyl mercaptide; and recovering substantially pure said mercaptide as product.

7. A process for preparation of substantially pure sodium n-propyl mercaptide comprising: contacting propylene with hydrogen sulfide to form a reaction product comprising a major amount of n-propyl mercaptan and a minor amount of di-n-propyl sulfide, the latter compound serving as reaction medium for subsequent reaction of said mercaptan; diluting the reaction product by adding a non-aqueous organic diluent to said reaction product; contacting the mercaptan with substantially non-aqueous sodium hydroxide having a sodium oxide content of at least 60 percent effecting the precipitation of sodium n-propyl mercaptide; and recovering substantially pure said mercaptide as product.

8. A process for the preparation of substantially pure mercaptides comprising: contacting an olefin with hydrogen sulfide to form a reaction product comprising a major amount of alkyl mercaptan and a minor amount of dialkyl sulfide; contacting the entire reaction product with substantially non-aqueous alkali metal hydroxide having an alkali metal oxide content of at least 60 percent effecting the precipitation of an alkali metal alkyl mercaptide; said minor amount of dialkyl sulfide serving as a reaction medium; separating said mercaptide from said liquid medium; washing the thus-separated mercaptide with a hydrocarbon wash liquid which is essentially a non-solvent for said mercaptide and which is lower boiling than any residual oil impurity with which the mercaptide may be contaminated; and recovering substantially pure mercaptide as product.

9. A process for the preparation of substantially pure sodium n-propyl mercaptide comprising: contacting propylene with hydrogen sulfide to form a reaction product comprising a major amount of n-propyl mercaptan and a minor amount of di-n-propyl sulfide, said di-n-propyl sulfide serving as a reaction medium for subsequent reaction; contacting said reaction product with anhydrous sodium hydroxide to form a precipitate of sodium n-propyl mercaptide; and recovering substantially pure sodium n-propyl mercaptide.

References Cited by the Examiner
UNITED STATES PATENTS

| | | | |
|---|---|---|---|
| 2,110,412 | 3/1938 | Yabrouff et al. | 260—609 |
| 2,422,826 | 6/1947 | Drennan | 260—609 |

CHARLES B. PARKER, *Primary Examiner.*

DANIEL D. HORWITZ, *Examiner.*